April 30, 1968

C. W. ALPEN 3,380,500

BROCCOLI CUTTER

Filed Nov. 26, 1965

INVENTOR.
CECIL W. ALPEN

BY *Eckhoff and Slick*

ATTORNEYS

April 30, 1968        C. W. ALPEN        3,380,500

BROCCOLI CUTTER

Filed Nov. 26, 1965        8 Sheets-Sheet 3

INVENTOR.
CECIL W. ALPEN
BY
*Eckhoff and Slick*
ATTORNEYS

April 30, 1968     C. W. ALPEN     3,380,500
BROCCOLI CUTTER

Filed Nov. 26, 1965     8 Sheets-Sheet 6

INVENTOR.
CECIL W. ALPEN
BY
Eckhoff and Slick
ATTORNEYS

United States Patent Office 3,380,500
Patented Apr. 30, 1968

3,380,500
BROCCOLI CUTTER
Cecil W. Alpen, 148 Glen Drive, Aptos, Calif. 95003
Filed Nov. 26, 1965, Ser. No. 509,722
4 Claims. (Cl. 146—78)

ABSTRACT OF THE DISCLOSURE

A cutter for broccoli and similar vegetables wherein a pair of guide arms grip the stem of the broccoli, leaving the head extending below the guide arms and a pusher element pushes the broccoli between the guide arms and into a knife whereby the broccoli is severed.

This invention relates to a broccoli trimmer and cutter and more particularly relates to an automatic machine for trimming and quartering broccoli rendering it in a suitable form for freezing or the like.

An object of the present invention is to provide an automatic machine which will trim and quarter broccoli producing a high percentage of usable quarters.

Another object of this invention is to provide a machine which will trim and quarter broccoli at a high rate of speed.

Another object of this invention is to provide a trimmer and cutter for broccoli which is relatively inexpensive to construct and maintain.

Other objects and features of the invention will be apparent from the balance of the specification.

In the drawings forming part of this application:

FIGURE 5A is a partial view, similar to FIGURE 5, showing an alternate structure.

Figure 1:
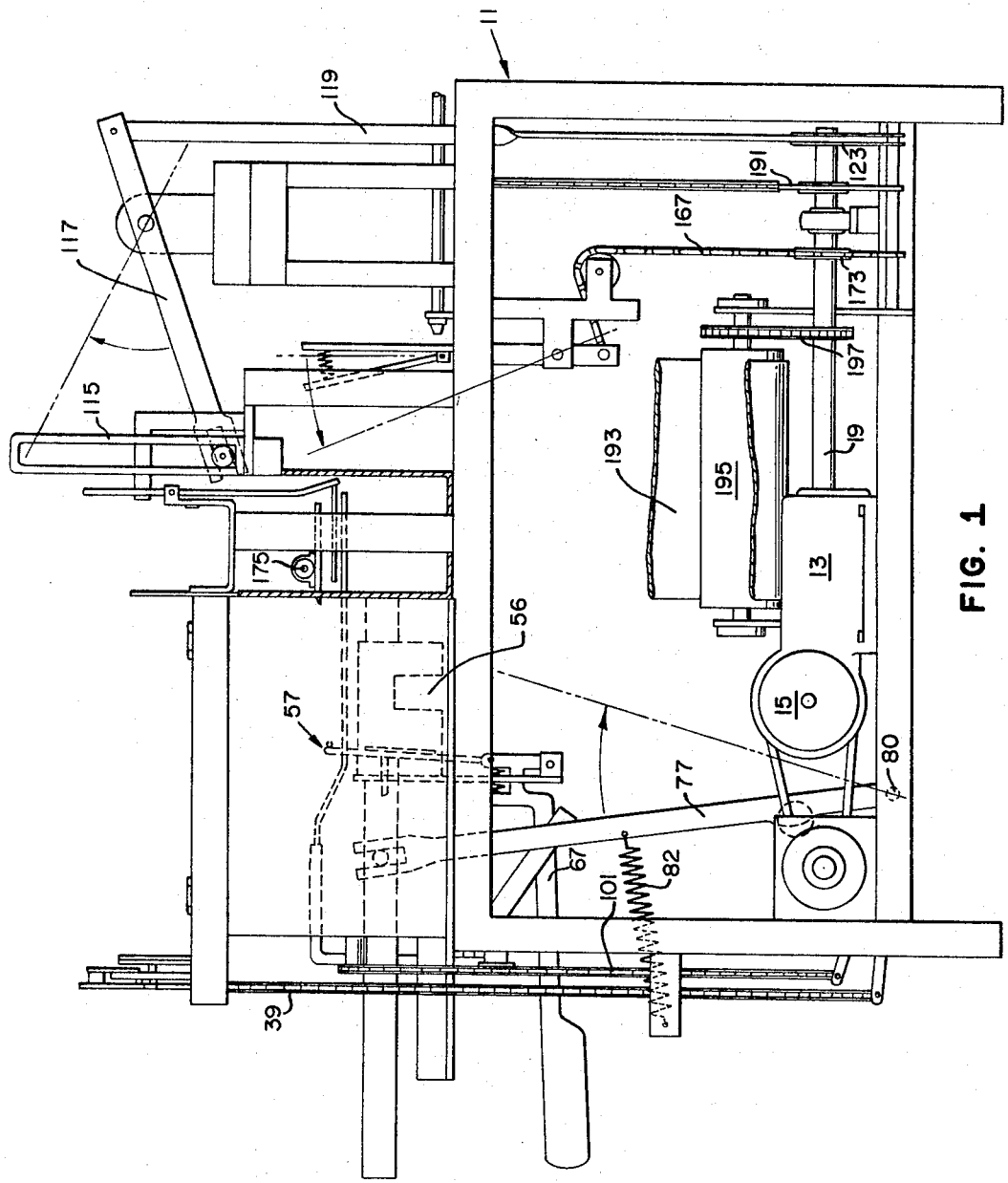
FIGURE 1 is a side view of a device embodying the present invention.
Figure 2:
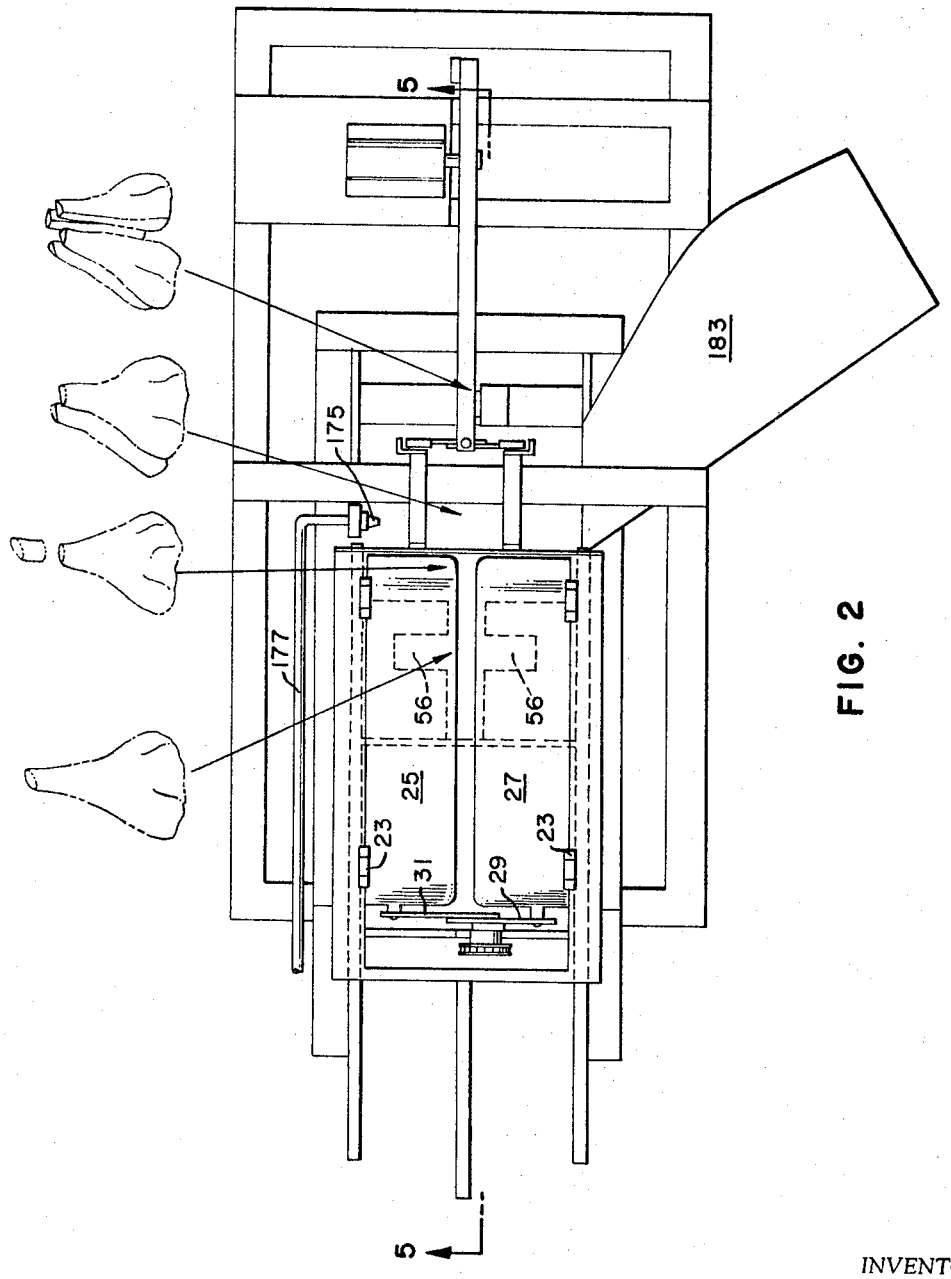
FIGURE 2 is a plan view of the device shown in FIGURE 1, in simplified form and showing the operations which are conducted as the broccoli passes through the machine.

Referring now to the drawings by reference characters, the device of the present invention is built on a frame generally designated 11 having mounted thereon a prime mover 13 having a gear reduction unit 15 which drives an end shaft 17. Shaft 17 drives side shaft 19 through bevel gears 21. Shafts 17 and 19 carry various cams, hereinafter explained in detail, for the actuation of the various movements of the machine.

Figure 3:
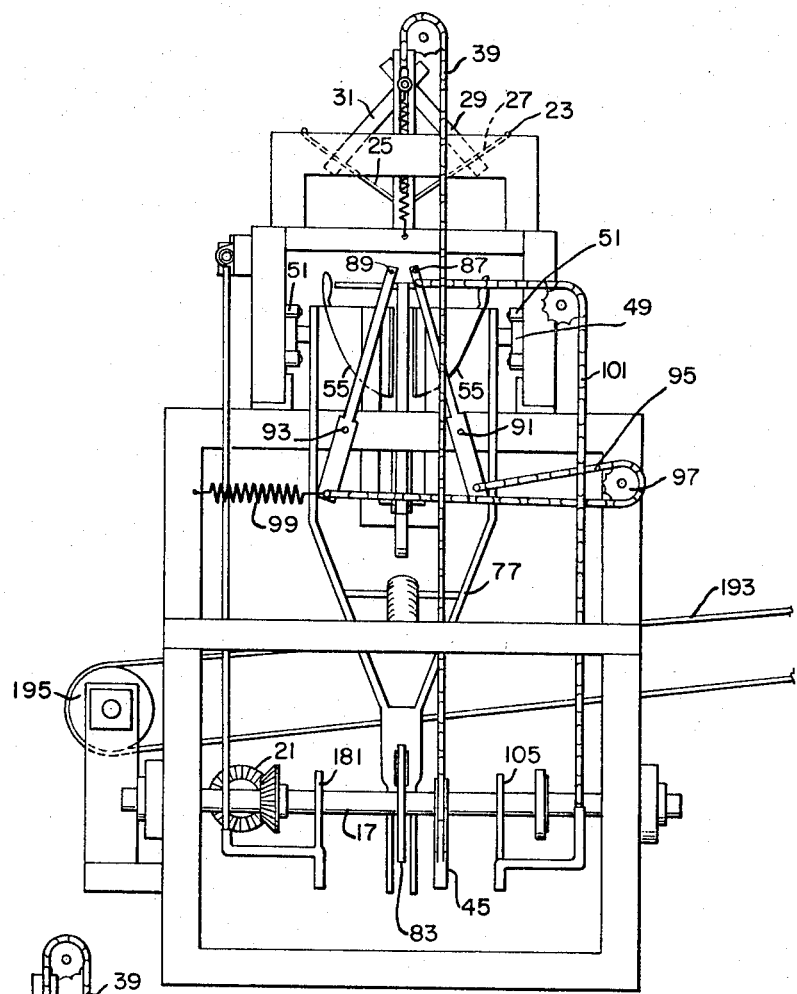
FIGURE 3 is an end view of the device of the present invention.
Figure 4:
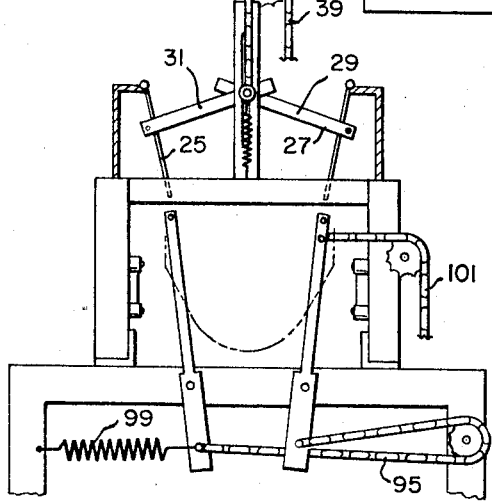
FIGURE 4 is a partial end view, similar to FIGURE 3, showing the parts in a different position.

Mounted on top of the frame work by means of hinges 23 are two trap doors 25 and 27. When closed, the trap doors make an angle with each other of a little more than 90°, as is best seen in FIGURE 3, forming a trough. These doors are adapted to open downwardly to an almost vertical position as is shown in FIGURE 4. Arms 29 and 31 are attached to the trap doors 27 and 25. These in turn are pivoted to a slider 33 mounted in slot 35. A chain 39 attached to slider 35 is trained around pinion 37 and biased by spring 41. Chain 39 leads to a cam follower 43 which bears against cam 45 on shaft 17. Spring 41 normally biases the trap doors to a closed position and also urges the cam follower 43 into contact with cam 45. Thus, at rest, the trap doors assume the closed position shown in FIGURE 3 and rotation of the cam 45 opens the doors to the position shown in FIGURE 4.

Figure 5:
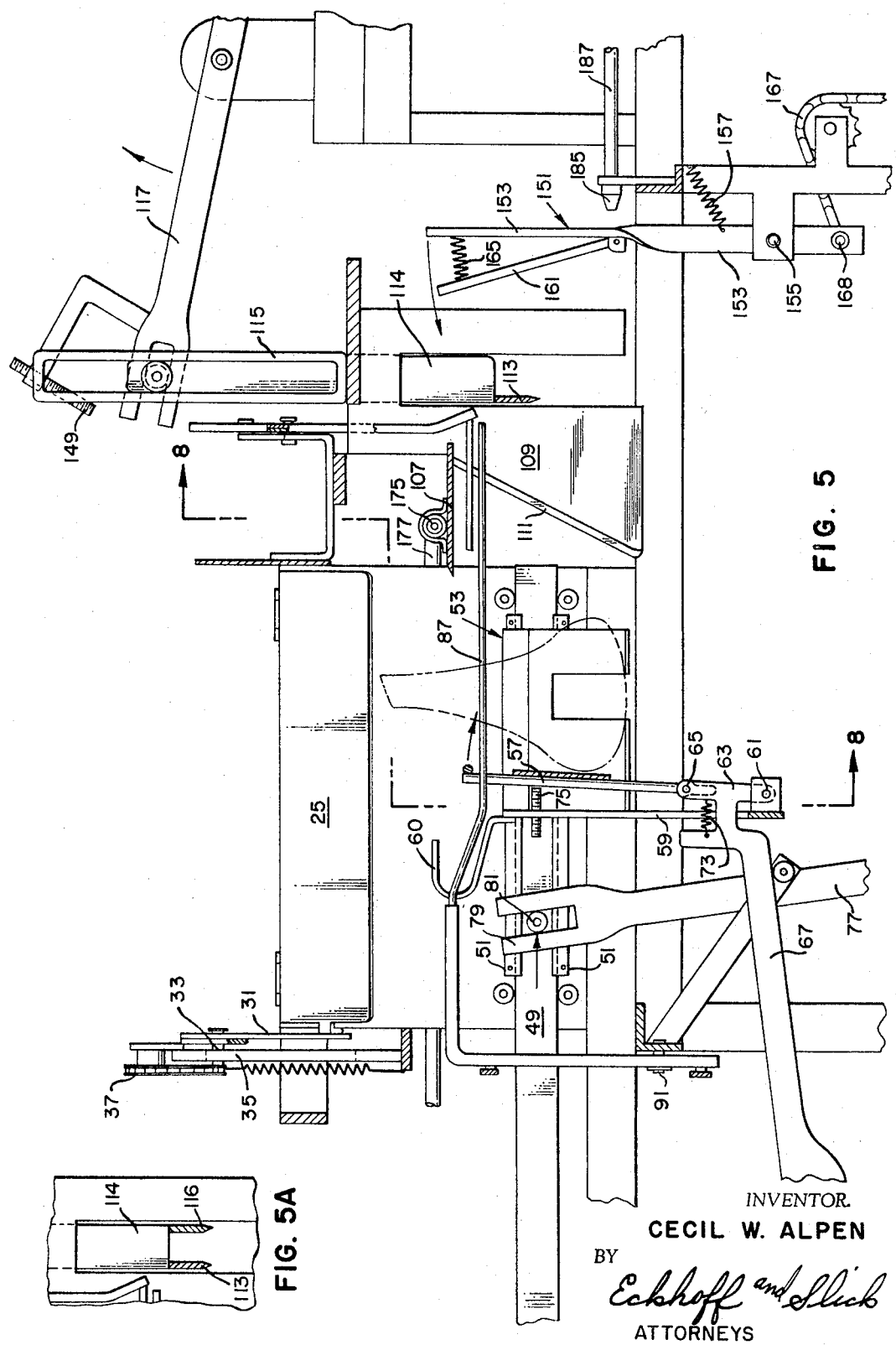
FIGURE 5 is a section on the line 5—5 of FIGURE 2.
Figure 6:
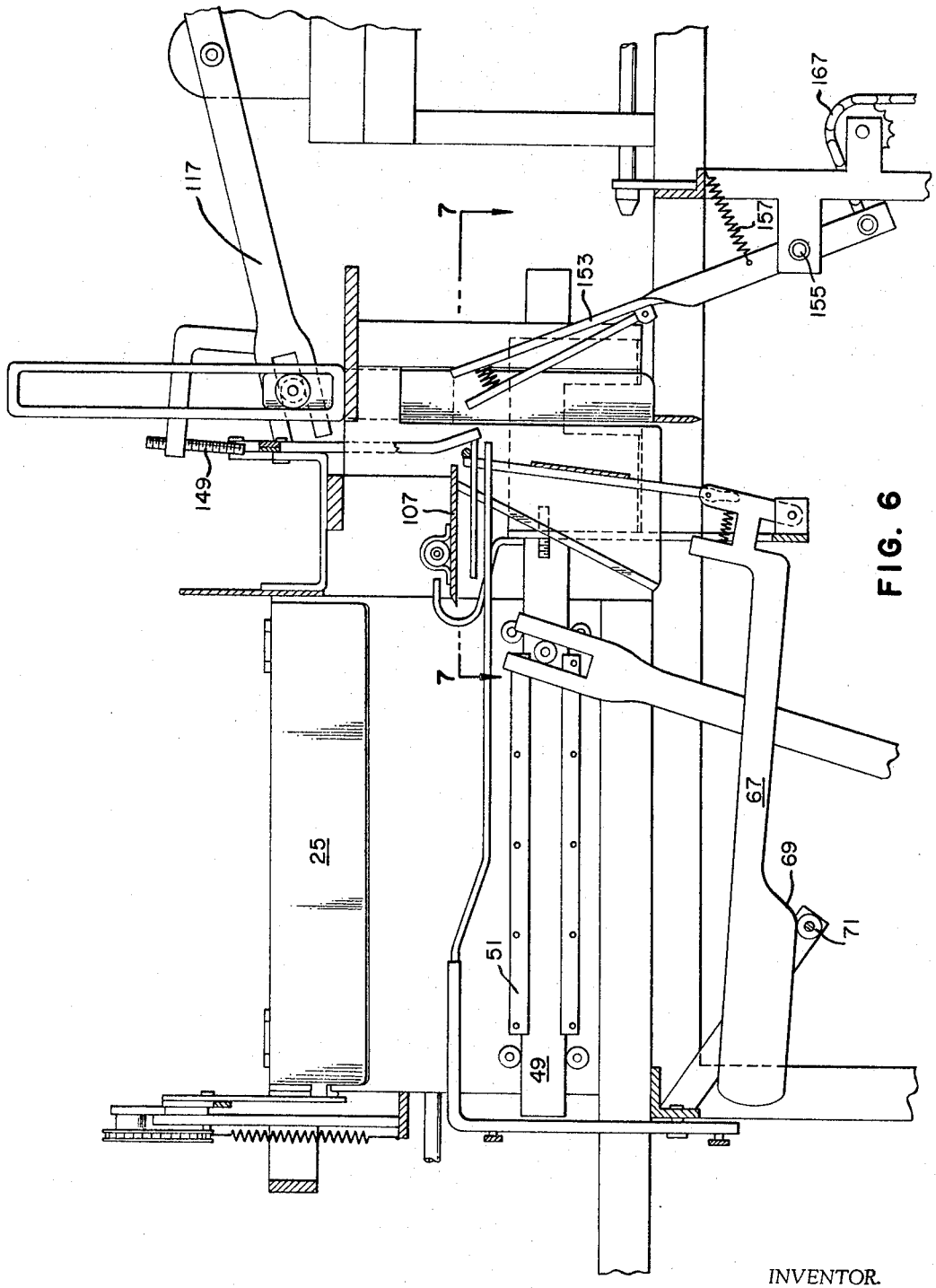
FIGURE 6 is a view similar to FIGURE 5 showing the parts in a different position.
Figure 7:
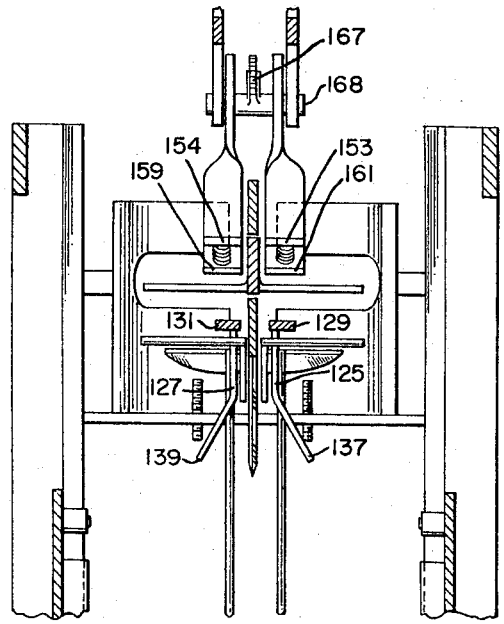
FIGURE 7 is a section on the line 7—7 of FIGURE 6.
Figure 8:
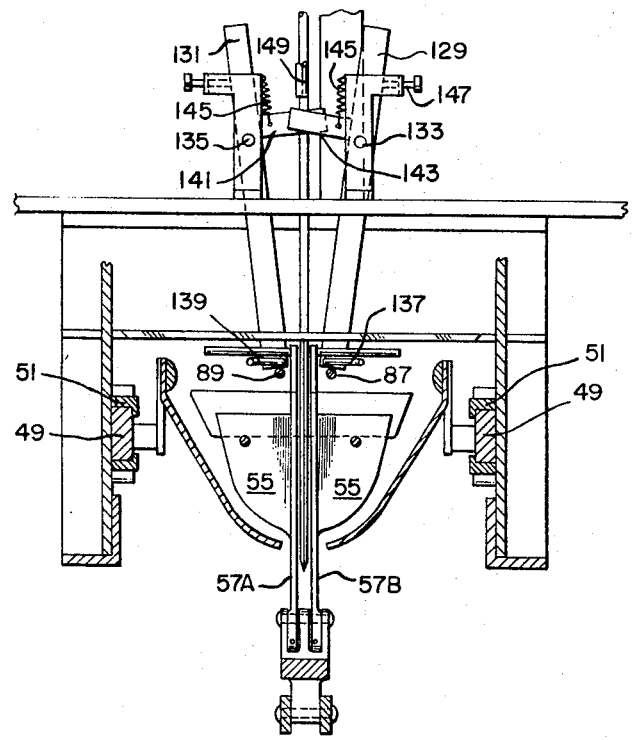
FIGURE 8 is a section on the line 8—8 of FIGURE 5.
Figure 9:
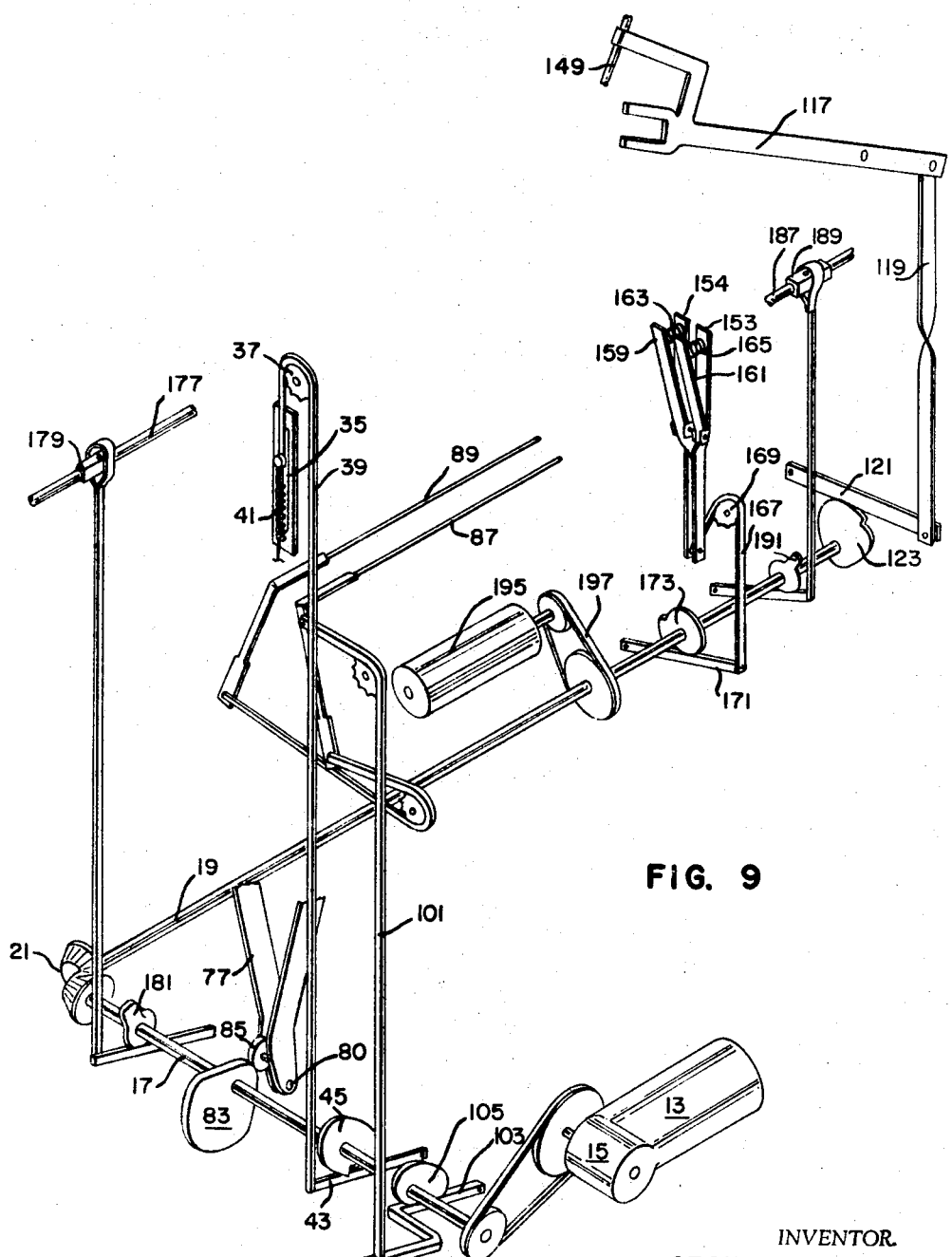
FIGURE 9 is a perspective view of various moving parts of the device with the inoperative parts cut away, to illustrate the function of the various mechanical movements.
Figure 10:
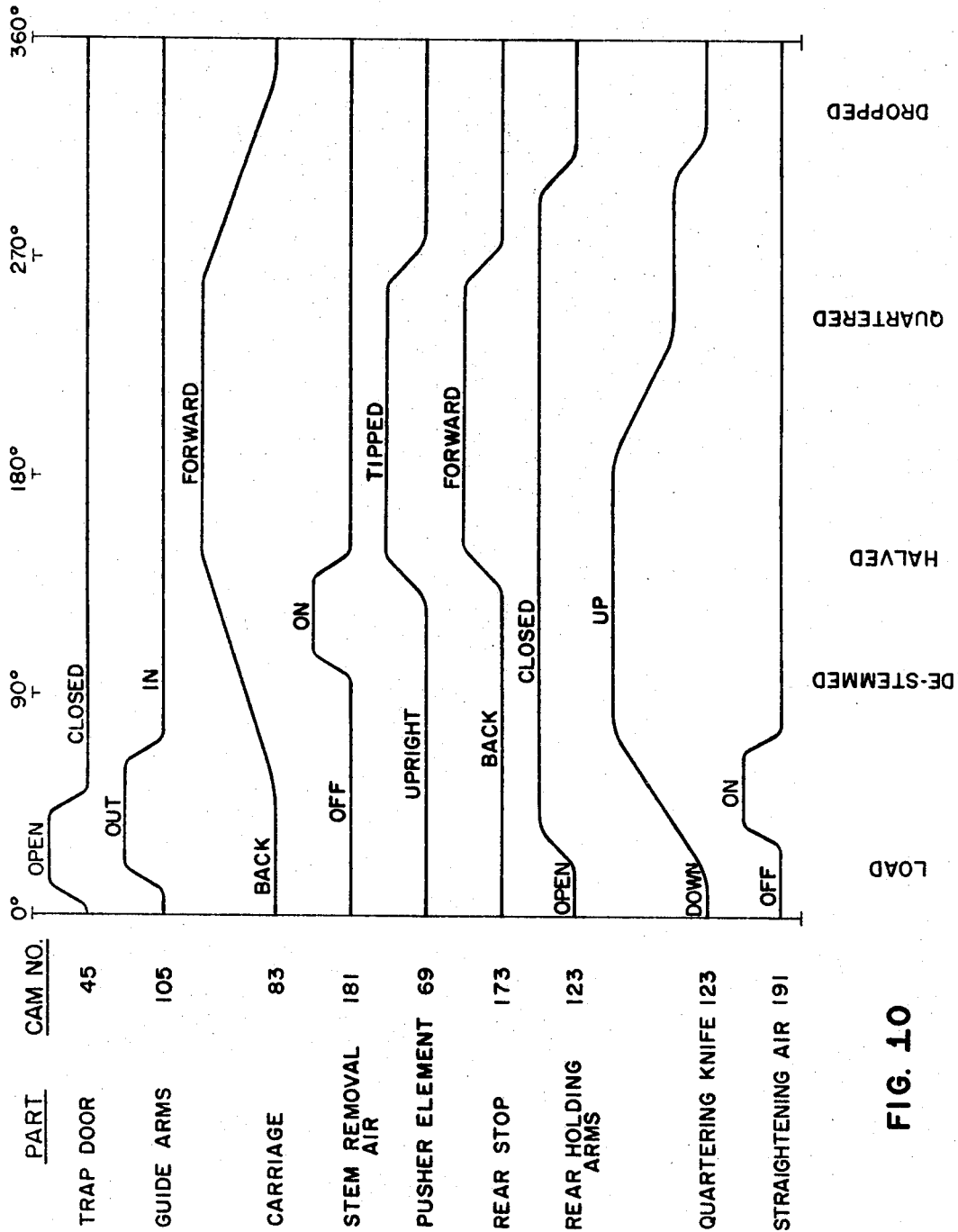
FIGURE 10 is a cam diagram showing the operation of the various movements of the device.

Arms 39 are mounted for reciprocation in the guides 51 and form a support for the carriage assembly generally designated 53. The carriage assembly 53 includes a split basket 55 of suitable size to receive a head of broccoli and also includes the pusher element generally designated 57 and having two arms 57-A and 57-B. Basket 55 is slotted, as at 56 so that the quartering knife, hereinafter described can pass through the slot. The pusher element 57 is mounted on arm 59 through a lower bearing 61, a link 63 and an upper bearing 65. Link 63 is connected with an arm 67 having a cam surface 69 on one end thereof which is adapted to ride over a fixed cam follower 71. A spring 73 normally biases member 57 outwardly but it is prevented from going completely forward by means of the lost motion screw 75. A yoke 77 having slotted arms 79 and pivoted at point 80 actuates the slide 49 through roller 81, the yoke 77 being biased by spring 82 and having a cam follower 85 actuated by cam 83. Thus, as the cam 83 rotates, the basket assembly 53 is moved forward and back on each stroke. In FIGURE 5, the assembly is shown in its rearmost or feed position while in FIGURE 6 the basket assembly is shown in its forward or discharge position. In addition, the action of the cam 69 acting on arm 67 through the linkage of 61 and 65 is such that as the pusher member 57 goes forward it goes from a substantially vertical position as shown in FIGURE 5 to an inclined position as is shown in FIGURE 6. The two arms 57-A and 57-B of the pusher assembly are spaced a short distance apart for reasons which will be obvious in the description hereafter given. An arm 60 extends from member 59 for the purpose of pushing the severed stem end forward. This is only necessary in the case of extra long stalks.

Two guide arms 87 and 89 are pivoted at the points 91 and 93 respectively and are interconnected by means of a roller chain 95 passing over sprocket 97, the chain being biased by a spring 99. It will be seen by reference to FIGURE 3 that the spring 99 ordinarily biases the two guides 87 and 89 toward each other. For the purpose of moving the guides apart, one end of a roller chain 101 is connected with one of the guide members while the opposite end is attached to a cam follower 103 bearing against cam 105 on shaft 17.

Mounted in the path of the carriage assembly 83 is a horizontal knife 107 and a vertical knife 109 having a cutting edge 111 set at an angle to the path of travel of the carriage.

Mounted further along in the path of travel is the reciprocating quartering knife 113 which is mounted on slider 114 which moves in guide 115, slider 114 being actuated by arm 117. Arm 117 is connected by means of a member 119 to a cam follower 121 which bears against cam 123 on shaft 19. In this manner, quartering knife 113 is given a vertical reciprocating motion. The motion of arm 117 is also used to control the position of the rear holding arms. The rear holding arms 125 and 127 are mounted on levers 129 and 131 which are pivoted at 133 and 135. The rear holding arms have outwardly flaring ends, 137 and 139, and the rear holding arms 125 and 127 are normally biased toward each other by springs. Arms 141 and 143 are attached to levers 129 and 131 and actuate the arms 129 and 131. Member 139 is connected to arm 117 so that as the arm descends, the member 149 contacts the arms 141 and 143 thus spreading the rear guides 125 and 127 apart. Thus cam 123 controls both the motion of the quartering knife and the rear holding arms.

A rear stop assembly generally designated 151 is provided, the assembly comprising arms 153 and 154 pivoted at 155 and normally biased in the rearward direction by springs 157. Arms 153 and 154 are separated at short distances from each other and each member has a pivoted element 159 and 161 which are normally urged outwardly by springs 163 and 165. A roller chain 167 is attached to pin 168 which connects the arms and passes over sprocket 169 and is connected to a cam follower 171 bearing against cam 173 on shaft 19.

The machine also includes an air nozzle 175 having a line 177 connected through a valve 179 to a source of compressed air. Valve 179 is actuated by cam 181 and serves to blow the severed stem into a chute 183 for discard. A second nozzle 185 is attached to line 187 which is connected through valve 189 to the source of compressed air, not shown. Valve 189 is controlled by a cam 191 on shaft 19.

The machine also includes a product discharge belt 193 which passes over a roller 195 which is driven by a belt 197 from shaft 19.

Having now described the various parts of the machine the detailed operation will be described.

An operator places a head of broccoli on the trap doors 25 and 27 with the head of the broccoli substantially half-way between the doors and preferably with the stem extending outwardly from either side, although the machine can be fed from any position. Cam 45 now causes the doors 25 and 27 to open depositing the head of broccoli into the split basket 55 with its head down and the stem extending upwardly and a blast of air from nozzle 185 helps straighten the stem. Cam 105 now causes the guide arms 87 and 89 to be released so that they come toward each other, grasping the stem as can best be seen in FIGURE 5. As has been previously mentioned, the spring 99 urges the guides 87 and 89 toward each other so that they grasp the stem with sufficient force to hold the stem upright but permit the stem to slide between the guides as it is pushed. Cam 83 now causes the basket assembly 53 to move forward, i.e. to the right in FIGURE 5, whereupon the stem of the broccoli is severed to a desired length by means of horizontal knife 107. As soon as the stem has been severed, cam 181 causes a blast of air to come from the nozzle 175, blowing the severed stem into the chute 183. As the basket assembly advances, the broccoli is pushed into the knife 109 where the angling blade 111 severs the broccoli into two halves. Almost simultaneously, the stem of the broccoli is forced between the flaring arms 137 and 139 of the rear guide members 125 and 127 and as the broccoli is advanced still further, cam 123 causes the quartering knife to descend, cutting each half into two quarter pieces. The back-up plate actuated by cam 173 has tilted forward, helping to center the broccoli on the knife 113. After the quartering knife has severed the two halves into quarters, member 149 pushes against arms 141 and 143 spreading the rear holding arms, releasing the broccoli so that it can fall onto the belt 103. This action may be assisted by a blast of air from a nozzle, not shown, in case there is any tendency for the cut broccoli to hang-up on the knife. In the meantime, an operator has placed another head of broccoli on the trap doors 25 and 27 for a repetition of the cycle.

It will be apparent to those skilled in the art that many variations can be made on the exact structure shown without departing from the spirit of this invention. Further, one or more of the operations can be conceivably omitted under some circumstances. Thus, it is obvious that if one wanted to divide the broccoli in halves, the quartering knife could be omitted. Further, although the machine has been described for trimming and cutting broccoli, it is obvious that the machine could be used for cutting and trimming other vegetable products. The double trap doors could be replaced by a single door, or eliminated altogether by feeding the broccoli directly into the basket.

In the case of extra large heads, it is desirable to cut the broccoli into six pieces rather than quarters. In this case, a double vertical knife is used as is shown in FIGURE 5. Here the slider 114 carries two blades 113 and 116.

I claim:
1. A cutter for broccoli or the like having a relatively small stem and a relatively large head comprising in combination:
    (a) a pair of elongated rod-like, horizontal, parallel guide arms,
    (b) means for moving said guide arms horizontally toward each other thereby gripping a broccoli stem therebetween leaving the head thereof extending below the guide arms,
    (c) pusher means whereby broccoli gripped between said guide arms is pushed along said guide arms in a path of travel and,
    (d) knife means in said path of travel whereby said broccoli is pushed into said knife means and severed thereby.
2. The structure of claim 1 wherein said knife means includes a first knife set at a right angle to the broccoli stem whereby said stem is trimmed and second knife means parallel to and in the path of travel whereby said broccoli is bisected.
3. The structure of claim 2 wherein the knife means includes a third knife, said third knife reciprocating in timed relationship to the movement of the broccoli, whereby said broccoli is quartered.
4. The structure of claim 1 wherein a trap door is provided over said guide arms, said trap door opening in timed relationship with said guide arms, whereby said trap door opens to deposit a head of broccoli thereon between the opened guide arms and the guide arms close, gripping the stem of the broccoli therebetween.

References Cited
UNITED STATES PATENTS

| 3,078,891 | 2/1963 | Rianda | 146—78 |
| 3,179,138 | 4/1965 | Norris | 146—78 X |
| 3,217,768 | 11/1965 | Lamb | 146—78 X |

JAMES M. MEISTER, *Primary Examiner.*